US012515561B2

(12) United States Patent
Yeom et al.

(10) Patent No.: US 12,515,561 B2
(45) Date of Patent: Jan. 6, 2026

(54) BATTERY ASSIST APPARATUS FOR FUEL CELL VEHICLE AND METHOD THEREOF

(71) Applicants: Hyundai Motor Company, Seoul (KR); Kia Corporation, Seoul (KR)

(72) Inventors: Sang Chul Yeom, Gyeonggi-do (KR); Seung Yoon Lee, Seoul (KR); Hyo Jun Kim, Gyeonggi-do (KR); Jae Hwan Choi, Gyeonggi-do (KR); Jong Seok Han, Gyeonggi-do (KR); Jeong Kyu Park, Gyeonggi-do (KR); Jae Hoon Jeong, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 213 days.

(21) Appl. No.: 17/971,119

(22) Filed: Oct. 21, 2022

(65) Prior Publication Data

US 2023/0256868 A1  Aug. 17, 2023

(30) Foreign Application Priority Data

Feb. 15, 2022  (KR) .................. 10-2022-0019291

(51) Int. Cl.
  *B60L 58/40* (2019.01)
  *B60L 15/20* (2006.01)
  *H01M 8/04858* (2016.01)
  *H01M 16/00* (2006.01)

(52) U.S. Cl.
  CPC ........... *B60L 58/40* (2019.02); *B60L 15/2072* (2013.01); *H01M 8/04925* (2013.01); *H01M 16/006* (2013.01); *B60L 2240/14* (2013.01); *B60L 2240/423* (2013.01); *B60L 2250/28* (2013.01);
  (Continued)

(58) Field of Classification Search
  CPC .. B60L 58/40; B60L 15/2072; B60L 2240/14; B60L 2240/423; B60L 2250/28; B60L 2260/26; B60L 58/13; B60L 2240/547; B60L 2240/549; H01M 8/04925; H01M 16/006; H01M 2220/20; H01M 2250/20; Y02T 10/70; Y02T 90/40; G01R 31/382; Y02E 60/50
  See application file for complete search history.

(56) References Cited

U.S. PATENT DOCUMENTS 9,561,790 B2 * 2/2017 Kanehara ............ B60W 50/085
2013/0030638 A1 * 1/2013 Nissato ............... B60W 50/082
                                                          180/65.23
(Continued)

FOREIGN PATENT DOCUMENTS

KR   10-2021-0069448 A   6/2021

*Primary Examiner* — Abdalla A Khaled
(74) *Attorney, Agent, or Firm* — Fox Rothschild LLP

(57) ABSTRACT

The present disclosure relates to a battery assisting apparatus and method for a fuel cell vehicle. An exemplary embodiment of the present disclosure provides a battery assisting apparatus for a fuel cell vehicle, including: a controller configured to determine an increase or decrease of driver's determination to accelerate based on a change rate of motor torque and a change rate of accelerator opening when a battery assistance mode is entered, and to release the battery assistance mode when the driver's determination to accelerate is decreased; and a storage configured to store data and algorithms driven by the controller.

14 Claims, 10 Drawing Sheets

(52) U.S. Cl.
CPC .... *H01M 2220/20* (2013.01); *H01M 2250/20* (2013.01)

(56) References Cited

U.S. PATENT DOCUMENTS

| | | | | |
|---|---|---|---|---|
| 2013/0166118 | A1* | 6/2013 | Kim | B60W 10/08 |
| | | | | 180/65.21 |
| 2014/0180516 | A1* | 6/2014 | Ueda | B60K 6/52 |
| | | | | 180/65.265 |
| 2015/0353075 | A1* | 12/2015 | Futatsudera | B60W 20/00 |
| | | | | 180/65.23 |
| 2016/0001767 | A1* | 1/2016 | Hisano | B60K 6/445 |
| | | | | 903/903 |
| 2016/0176310 | A1* | 6/2016 | Sato | B60L 53/00 |
| | | | | 180/65.25 |
| 2016/0176391 | A1* | 6/2016 | Sato | B60W 20/15 |
| | | | | 180/65.23 |
| 2016/0244045 | A1* | 8/2016 | Sato | B60W 20/15 |
| 2016/0244048 | A1* | 8/2016 | Sato | B60W 10/08 |
| 2016/0272190 | A1* | 9/2016 | Morisaki | B60W 20/00 |
| 2016/0304078 | A1* | 10/2016 | Imamura | B60K 6/547 |
| 2020/0189557 | A1* | 6/2020 | Sakamoto | B60W 10/08 |
| 2020/0282970 | A1* | 9/2020 | Kim | B60L 58/22 |
| 2021/0146912 | A1* | 5/2021 | Choi | F02M 26/03 |
| 2022/0169122 | A1* | 6/2022 | Jang | B60L 50/60 |
| 2022/0281325 | A1* | 9/2022 | Naito | B60L 50/15 |
| 2023/0182579 | A1* | 6/2023 | Koga | B60W 10/20 |
| | | | | 303/152 |

* cited by examiner

BATTERY ASSIST APPARATUS FOR FUEL CELL VEHICLE AND METHOD THEREOF

CROSS-REFERENCE TO RELATED APPLICATION

This application claims under 35 U.S.C. § 119(a) the benefit of Korean Patent Application No. 10-2022-0019291, filed in the Korean Intellectual Property Office on Feb. 15, 2022, the entire contents of which are incorporated herein by reference.

FIELD OF THE DISCLOSURE

Embodiments of the present disclosure relate to a battery assisting apparatus and method for a fuel cell vehicle, and more particularly, to a technique for improving driving performance and optimizing a battery state of charge (SOC) through varied control of a battery assistance mode.

DESCRIPTION OF THE RELATED ART

A battery state of charge (SOC) of a fuel cell vehicle is tuned to maintain a certain level. However, when driving on highways and on long slopes, the battery SOC cannot be maintained at a certain level due to continuous use of the battery caused by frequent overtaking and acceleration, etc., and maintains a low level in many cases.

As such, when the SOC is lowered below a certain level so that battery assistance becomes impossible, a voltage drops depending on a driving pattern, resulting in a sense of difference in drivability.

A battery assistance mode release condition basically considers an accelerator opening degree and motor torque, but normally, the battery assistance mode is released when an accelerator is off.

When the assistance mode is entered, the assistance is unnecessary in a section where the accelerator is changed until the accelerator is off, and even in a section where the vehicle can be driven with a stack output, to consume the SOC. FIG. 1 illustrates a graph showing a state when battery assistance is applied to a general fuel cell vehicle. As illustrated in FIG. 1, an assistance disabling section occurs due to battery assistance duration exceeding, and when re-acceleration, an output cannot be supported in a section where the battery assistance is required, so the vehicle shakes due to a stack voltage drop.

The above information disclosed in this Background section is only for enhancement of understanding of the background of the disclosure, and therefore, it may contain information that does not form the prior art that is already known in this country to a person of ordinary skill in the art.

SUMMARY OF THE DISCLOSURE

An exemplary embodiment of the present disclosure has been made in an effort to provide a battery assisting apparatus and method for a fuel cell vehicle, capable of optimizing a battery assistance section by variably controlling a battery assistance mode based on real-time driver demand output (e.g., a change rate of motor torque and a change rate of accelerator opening, etc.) in a battery assistance entering mode, and ensuring that assistance is always available in an acceleration situation by improving a rapid decrease in a battery SOC and maintaining the SOC above a certain level.

The technical objects of the present disclosure are not limited to the objects mentioned above, and other technical objects not mentioned can be clearly understood by those skilled in the art from the description of the claims.

An exemplary embodiment of the present disclosure provides a battery assisting apparatus for a fuel cell vehicle, including: a controller configured to determine an increase or decrease of driver's determination to accelerate based on a change rate of motor torque and a change rate of accelerator opening when a battery assistance mode is entered, and to release the battery assistance mode when the driver's determination to accelerate is decreased; and a storage configured to store data and algorithms driven by the controller.

In an exemplary embodiment, the controller may release the battery assistance mode even when an accelerator is not off, in the case where the driver's determination to accelerate is decreased.

In an exemplary embodiment, the controller may enter a hybrid power mode when the battery assistance mode is entered, and may calculate the change rate of motor torque from a maximum value to 0% and the change rate of accelerator opening as a first change rate by using a peak value of accelerator opening and a peak value of motor torque at a time of entering the hybrid power mode as a maximum value.

In an exemplary embodiment, the controller may determine that the accelerator is off, and release the battery assistance mode when the first change rate is 100% or more.

In an exemplary embodiment, the controller may switch from the hybrid power mode to a hybrid idle mode when a state that the first change rate is less than 100% and is greater than a first predetermined threshold value is maintained for a predetermined time.

In an exemplary embodiment, the controller may calculate the change rate of accelerator opening from a minimum value to 100% as a second change rate by setting an accelerator opening value at a time of switching to the hybrid idle mode to a minimum value.

In an exemplary embodiment, the controller may release the battery assistance mode when an accelerator is turned off, in the case where the second change rate is less than or equal to a second predetermined threshold value.

In an exemplary embodiment, the controller may check a battery state of charge (SOC) when the second change rate is greater than the second threshold value.

In an exemplary embodiment, may vary a battery assistance duration time by using the battery SOC and a target SOC.

In an exemplary embodiment, the controller may vary the battery assistance duration time such that the battery SOC maintains the target SOC.

In an exemplary embodiment, the controller may determine again whether the second change rate exceeds the second threshold value when the varied battery assist duration time is exceeded.

In an exemplary embodiment, may continue to perform the battery assistance mode when the varied battery assistance duration time is not exceeded, and release the battery assistance mode when an accelerator is off.

In an exemplary embodiment, the controller may check a battery SOC, to vary an assistance duration time by using the battery SOC when a state in which the first change rate is equal to or smaller than a first predetermined threshold value is maintained for a predetermined time.

In an exemplary embodiment, the controller may enter the battery assistance mode when there is driver's determination to accelerate, may release the battery assistance mode when an accelerator is off, and may determine whether to release the battery assistance mode depending on a decrease rate of the driver's determination to accelerate when the driver's determination to accelerate is decreased.

In an exemplary embodiment, the controller may enter a hybrid idle mode when the decrease rate of the driver's determination to accelerate is greater than a first predetermined reference value, sets an accelerator opening value at a time of switching the hybrid idle mode to a minimum value, and determines whether to release the battery assistance mode by using the change rate of accelerator opening from the minimum value to 100%.

An exemplary embodiment of the present disclosure provides a battery assisting method for a fuel cell vehicle, including: the calculating of the change rate of motor torque and the change rate of accelerator opening may include: determining an increase or decrease of driver's determination to accelerate based on the change rate of motor torque and the change rate of accelerator opening; and releasing the battery assistance mode when the driver's determination to accelerate is decreased.

In an exemplary embodiment, the calculating of the change rate of motor torque and the change rate of accelerator opening may include: entering a hybrid power mode when the battery assistance mode is entered; and calculating the change rate of motor torque from a maximum value to 0% and the change rate of accelerator opening as a first change rate by using a peak value of accelerator opening and a peak value of motor torque at a time of entering the hybrid power mode as a maximum value. In an exemplary embodiment, the releasing of the battery assistance mode may include:

determining that the accelerator is off, and releases the battery assistance mode when the first change rate is 100% or more; and switching from the hybrid power mode to a hybrid idle mode when a state that the first change rate is less than 100% and is greater than a first predetermined threshold value is maintained for a predetermined time.

In an exemplary embodiment, the releasing of the battery assistance mode may further include: calculating the change rate of accelerator opening from a minimum value to 100% as a second change rate by setting an accelerator opening value at a time of switching to the hybrid idle mode to a minimum value; and releasing the battery assistance mode when an accelerator is turned off, in the case where the second change rate is less than or equal to a second predetermined threshold value.

In an exemplary embodiment, the releasing of the battery assistance mode may further include: checking a battery state of charge (SOC) when the second change rate is greater than the second threshold value; varying a battery assistance duration time by using the battery SOC and a target SOC; determining whether the varied battery assistance duration time is exceeded; and determining again whether the second change rate exceeds the second threshold value when the varied battery assist duration time is exceeded.

According to the present technique, it is possible to optimize a battery assistance section by variably controlling a battery assistance mode based on real-time driver demand output (e.g., a change rate of motor torque and a change rate of accelerator opening, etc.) in a battery assistance entering mode, and to ensure that assistance is always available in an acceleration situation by improving a rapid decrease in a battery SOC and maintaining the SOC above a certain level.

In addition, various effects that can be directly or indirectly identified through this document may be provided.

As discussed, the method and system suitably include use of a controller or processor.

In another embodiment, vehicles are provided that comprise an apparatus as disclosed herein.

DETAILED DESCRIPTION OF THE EMBODIMENTS

Figure 1:
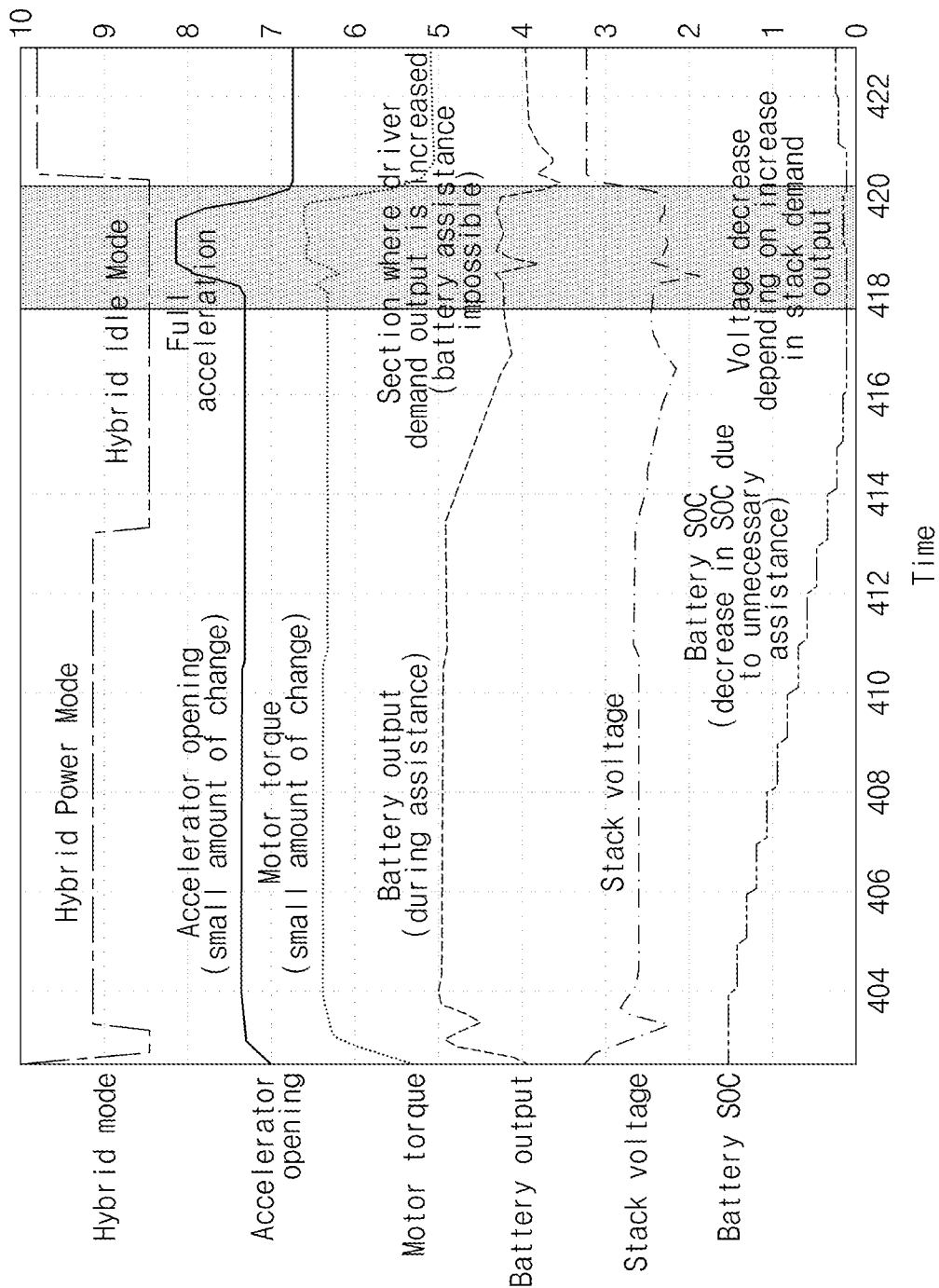
FIG. 1 illustrates a graph showing a state when battery assistance is applied to a general fuel cell vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary embodiments of the present disclosure will be described in detail with reference to FIG. 2 to FIG. 9.

Figure 2:
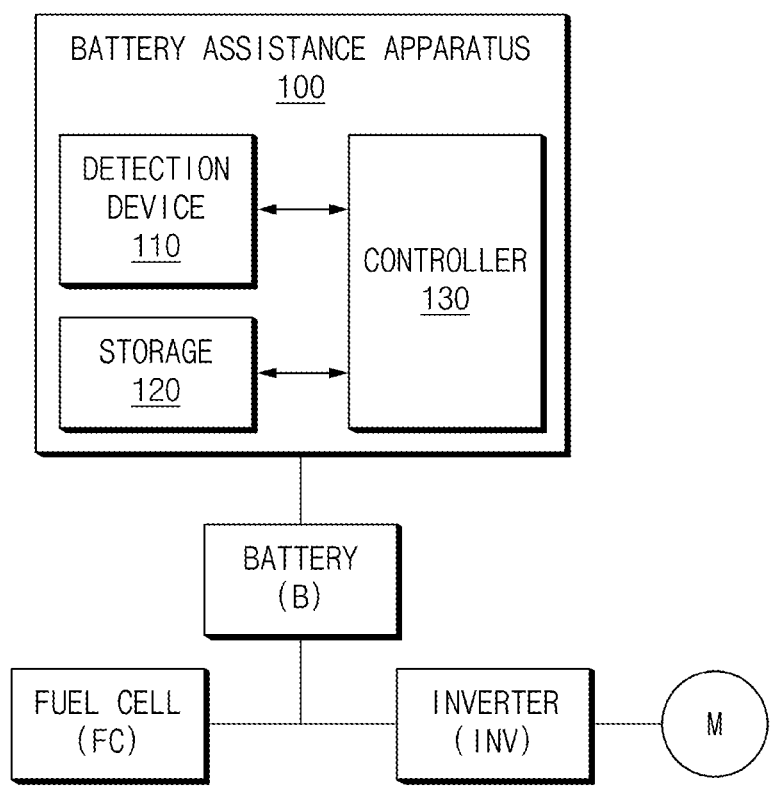
FIG. 2 illustrates a block diagram showing a configuration of a vehicle system including a battery assisting apparatus for a fuel cell vehicle according to an exemplary embodiment of the present disclosure.

FIG. 2 illustrates a block diagram showing a configuration of a vehicle system including a battery assisting apparatus for a fuel cell vehicle according to an exemplary embodiment of the present disclosure.

Referring to FIG. 2, the vehicle system according to the exemplary embodiment of the present disclosure may include a battery assisting apparatus 100, a battery, a fuel cell FC, and an inverter INV.

The battery assisting apparatus 100 according to the exemplary embodiment of the present disclosure may be implemented inside vehicle path the vehicle. In this case, the battery assisting apparatus 100 for the fuel cell vehicle may be integrally formed with internal control units of the vehicle, or may be implemented as a separate device to be connected to control units of the vehicle by a separate connection means.

In the case where a battery assistance mode is entered, the battery assisting apparatus 100 may determine an increase or decrease of driver's determination to accelerate based on a change rate of motor torque and a change rate of accelerator opening, and in the case where the driver's determination to accelerate is decreased, even when the accelerator is not off, may release the battery assistance mode to prevent consumption of a battery SOC due to unnecessary battery assistance.

The battery may be configured as a high voltage battery. The battery stores (charges) electrical energy (power) produced by the fuel cell FC through a chemical reaction between hydrogen and oxygen, or discharges (discharges) the stored electrical energy. The battery may include a power converter for controlling input and output of the battery. The power converter controls output power outputted from the battery or input power inputted to the battery. The power converter may be implemented as a bidirectional high voltage DC-DC converter (BHDC). The fuel cell FC and the battery supply electric power required to drive a driving motor M of the fuel cell vehicle. The fuel cell FC may be used as a main power source of the fuel cell vehicle, and the battery may be used as an auxiliary power source.

The inverter INV may convert high voltage DC power supplied from the fuel cell FC and/or the battery into a specific level of power (AC or DC) required to drive the motor. For example, the inverter INV may convert a high voltage outputted from the fuel cell FC and/or the battery into a three-phase AC voltage.

The driving motor M is an electric motor driven by driving power supplied through the inverter INV. An operation mode of the vehicle depending on whether the driving motor M is driven may be divided into a fuel cell mode that uses the output of the fuel cell FC alone, an electric vehicle (EV) mode that uses the output of the vehicle alone, and a hybrid (HEV) mode that uses the output of fuel cell FC and battery.

Referring to FIG. 2, the battery assisting apparatus 100 for the fuel cell vehicle may include a detection device 110, a storage 120, and a controller 130.

The detection device 110 may detect an SOC (remaining battery level) of the battery through sensor(s) (e.g., a voltage sensor and/or a current sensor) installed in the battery.

The storage 120 may store detection results of the detection device 110 and data and/or algorithms required for the controller 130 to operate, and the like. As an example, the storage 120 may store a change rate of motor torque, a rate change rate accelerator opening, a reference value for releasing the battery assistance mode, and the like.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The controller 130 may be electrically connected to the detection device 110, the storage 120, and the like, may electrically control each component, and may be an electrical circuit that executes software commands, thereby performing various data control and calculations described below.

The controller 130 may control a signal transferred between components of the battery assisting apparatus 100 for the fuel cell vehicle, and may perform overall control such that each of the components can perform its function normally.

The controller 130 may be implemented in the form of hardware, software, or a combination of hardware and software, and preferably, may be implemented as at least one of an application specific integrated circuit (ASIC), a digital signal processor (DSP), a programmable logic devices (PLD), a field programmable gate arrays (FPGA), a central processing unit (CPU), a microcontroller, or a microprocessor. It may be, e.g., an electronic control unit (ECU), a micro controller unit (MCU), or other subcontrollers mounted in the vehicle.

When the battery assistance mode is entered, the controller 130 may determine an increase or decrease of driver's determination to accelerate based on a change rate of motor torque and a change rate of accelerator opening, and when the driver's determination to accelerate is decreased, may release the battery assistance mode.

In the case where the driver's determination to accelerate is decreased even when the accelerator is not off, the controller 130 may release the battery assistance mode.

When the battery assistance mode is entered, the controller 130 may enter a hybrid power mode, and may calculate a change rate of motor torque from a maximum value to 0% and a change rate of accelerator opening as a first change rate by using a peak value of accelerator opening and a peak value of motor torque at the time of entering the hybrid power mode as a maximum value.

When the first change rate is 100% or more, the controller 130 may determine that the accelerator is off, and may release the battery assistance mode.

The controller 130 may switch from the hybrid power mode to a hybrid idle mode when a state that the first change rate is less than 100% and is greater than a first predetermined threshold value is maintained for a predetermined time. In this case, the first threshold value may be determined and stored in advance by an experiment value.

The controller 130 may calculate the change rate of accelerator opening from a minimum value to 100% as a second change rate by setting an accelerator opening value at the time of switching to the hybrid idle mode to a minimum value.

In the case where the second change rate is less than or equal to a second predetermined threshold value, when the accelerator is off, the controller 130 may release the battery assistance mode. In this case, the second threshold value may be determined and stored in advance by an experiment value.

When the second change rate is greater than the second threshold value, the controller 130 may check a battery state of charge (SOC).

The controller 130 may vary a battery assistance duration time by using the battery SOC and a target SOC. That is, the controller 130 may vary the battery assistance duration time such that the battery SOC maintains the target SOC.

The controller 130 may determine whether the varied battery assistance duration time is exceeded, and may determine again whether the second change rate exceeds the second threshold value when the varied battery assist duration time is exceeded.

When the varied battery assistance duration time is not exceeded, the controller 130 may continue to perform the battery assistance mode, and may release the battery assistance mode when the accelerator is off.

When the state in which the first change rate is equal to or less than the first predetermined threshold value is maintained for a predetermined time, the controller 130 may check a battery SOC, to vary the assistance duration time by using the battery SOC.

The controller 130 may enter the battery assistance mode when there is driver's determination to accelerate and may release the battery assistance mode when the accelerator is off, and may determine whether to release the battery assistance mode depending on a decrease rate of the driver's determination to accelerate when the driver's determination to accelerate is decreased.

The controller 130 may enter the hybrid idle mode when the decrease rate of the driver's determination to accelerate is greater than a first predetermined reference value, may set an accelerator opening value at the time of switching the hybrid idle mode to a minimum value, and may determine whether to release the battery assistance mode by using the change rate of accelerator opening from the minimum value to 100%.

Figure 3:
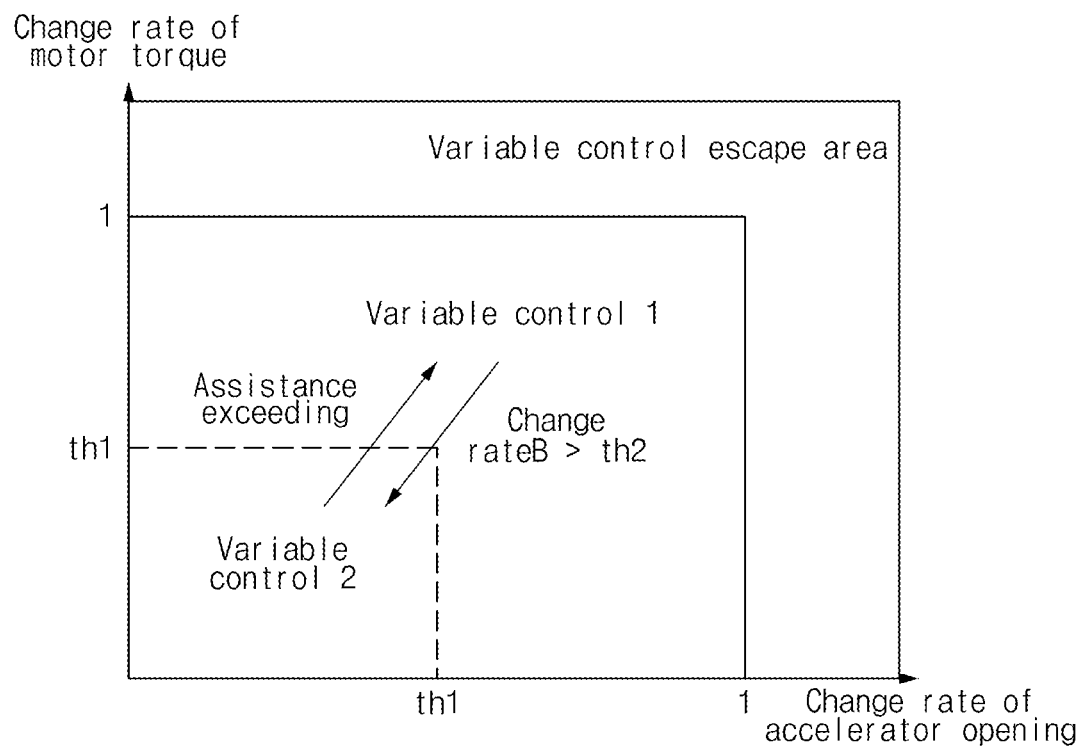
FIG. 3 illustrates a variable control application section depending on a change rate of motor torque and a change rate of accelerator opening of a fuel cell vehicle for a fuel cell vehicle according to an exemplary embodiment of the present disclosure.

FIG. 3 illustrates a variable control application section depending on a change rate of motor torque and a change rate of accelerator opening of a fuel cell vehicle for a fuel cell vehicle according to an exemplary embodiment of the present disclosure.

Referring to FIG. 3, the battery assisting apparatus 100 may apply variable control logic when a change rate of motor torque and a change rate of accelerator opening are less than 1.

When the variable control logic is applied, the battery assisting apparatus 100 may classify and apply Variable control logic 1 and Variable control logic 2 depending on a threshold value th1 based on the change rate of motor torque and the change rate of accelerator opening. In Variable control logic 1, when a state that a first change rate A depending on the change rate of motor torque and the change rate of accelerator opening is less than 100% and is greater than the threshold value th1 continues for t seconds, the hybrid idle mode is entered to maintain Variable control logic 1, but it is possible to enable battery assistance at all times by determining whether to continue the battery assistance in consideration of a second change rate B depending on the change rate of accelerator opening. Previously, the battery assistance was not possible during re-acceleration after an assistance duration time exceeded.

In addition, in Variable control logic 2, when a state that the first change rate A depending on the change rate of motor torque and the change rate of accelerator opening is less than or equal to the threshold value th1 continues for t seconds, a battery assistance duration time is determined by maintaining a hybrid power mode but determining a current battery SOC. Conventionally, the battery assistance duration time is fixed (e.g., 10 seconds), but in the present disclosure, the assistance duration time for maintaining a SOC target may be varied. In this case, the battery assisting apparatus 100 switches to Variable control logic 1 when the assistance duration time is exceeded while Variable control logic 2 is performed.

Figure 4:
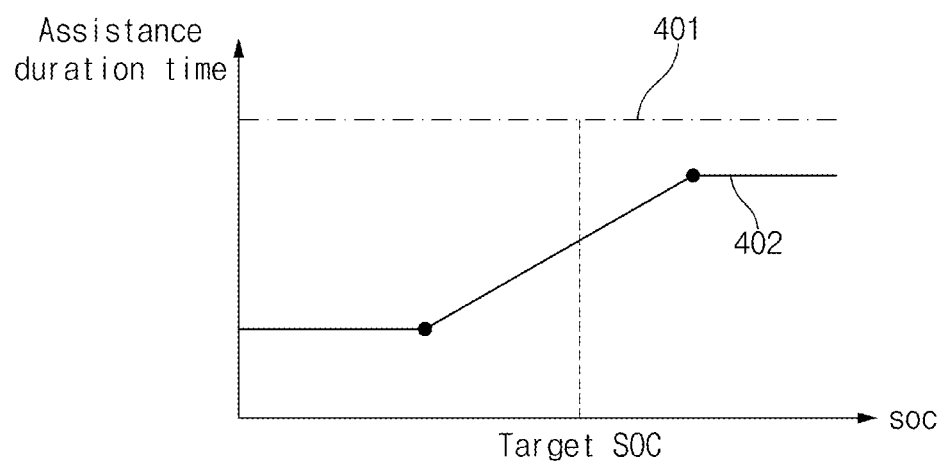
FIG. 4 illustrates a view for describing a battery assistance duration time of a fuel cell vehicle according to an exemplary embodiment of the present disclosure.

FIG. 4 illustrates a view for describing a battery assistance duration time of a fuel cell vehicle according to an exemplary embodiment of the present disclosure.

Referring to FIG. 4, in the past, it can be seen that an assistance duration time 401 for each battery SOC is constant regardless of the SOC. Accordingly, in the past, there was a situation where assistance was continued, and the battery SOC was used excessively, which is eventually reduced and reached an assistance impossible area, and when a driver asks to accelerate, there may be cases where assistance is not possible, and a motor output may rise sharply, resulting in a decrease in an intermittent stack voltage.

In the present disclosure, the assist duration time is mapped depending on the battery SOC (402). That is, when the current battery SOC is higher than the SOC target, the assistance duration time is increased to actively use the assistance, and when the current battery SOC is lower than the SOC target, the assist duration time is decreased to minimize use of the assistance. As such, according to the present disclosure, it is possible to reduce an assistance impossible situation and to optimize SOC maintenance through assistance duration time mapping.

Figure 5:
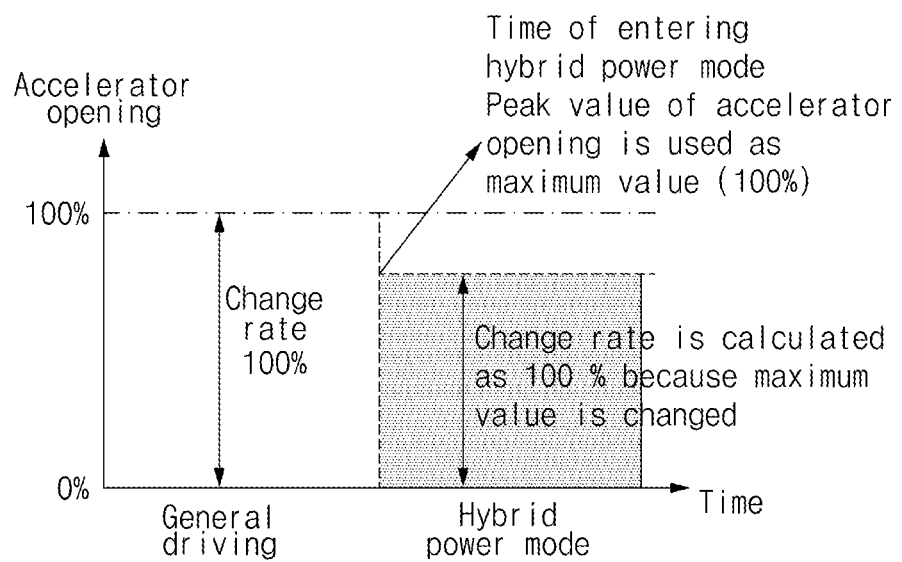
FIG. 5 illustrates a view for describing a first change rate according to an exemplary embodiment of the present disclosure.

FIG. 5 illustrates a view for describing a first change rate according to an exemplary embodiment of the present disclosure.

The first change rate may be calculated based on a hybrid power mode entry point, and may be used to distinguish Variable control logic 1 and Variable control logic 2.

Referring to FIG. 5, the battery assisting apparatus 100 may calculate the first change rate by using a peak value of accelerator opening at the time of entering the hybrid power mode as a maximum value (100%). In this case, since conditions for entering the hybrid power mode are an SOC and an accelerator opening value, a first change rate may be calculated by using the accelerator opening value at a time of entering a power mode as the maximum value. An unnecessary assistance situation may be recognized in all sections. That is, a peak value of accelerator opening at the time of entering the hybrid power mode as the maximum value (100%), to calculate motor torque and a change rate of accelerator opening within the maximum value. The motor torque and the change rate accelerator opening calculated in this way become the first change rate.

Figure 6:
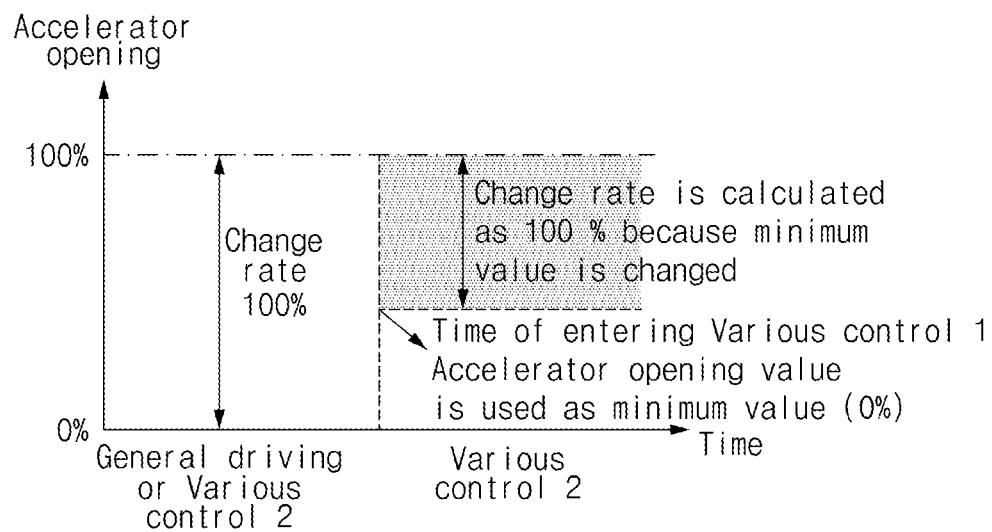
FIG. 6 illustrates a view for describing a second change rate according to an exemplary embodiment of the present disclosure.

FIG. 6 illustrates a view for describing a second change rate according to an exemplary embodiment of the present disclosure.

The second change rate is a calculated value that is used only in a section of Variable control logic 1, and is not used in other sections.

Referring to FIG. 6, the battery assisting apparatus 100 may calculate the second change rate by using an accelerator opening value at the time of entering the section of Variable control logic 1 (a time of entering the hybrid idle mode) as a minimum value (0%).

The accelerator opening value at a time of entering the section of variable control logic 1 is different even in a driving situation, since it is difficult to determine driver's determination to accelerate with only accelerator opening, the second change rate may be calculated using an accelerator opening value at an entry point, and the driver's determination to accelerate in all sections may be determined. That is, it is possible to calculate the change rate within 100% of the accelerator opening value at a time of entering the hybrid idle mode by setting a minimum value of 0% to the accelerator opening value at the time of entering the hybrid idle mode.

Figure 7A:
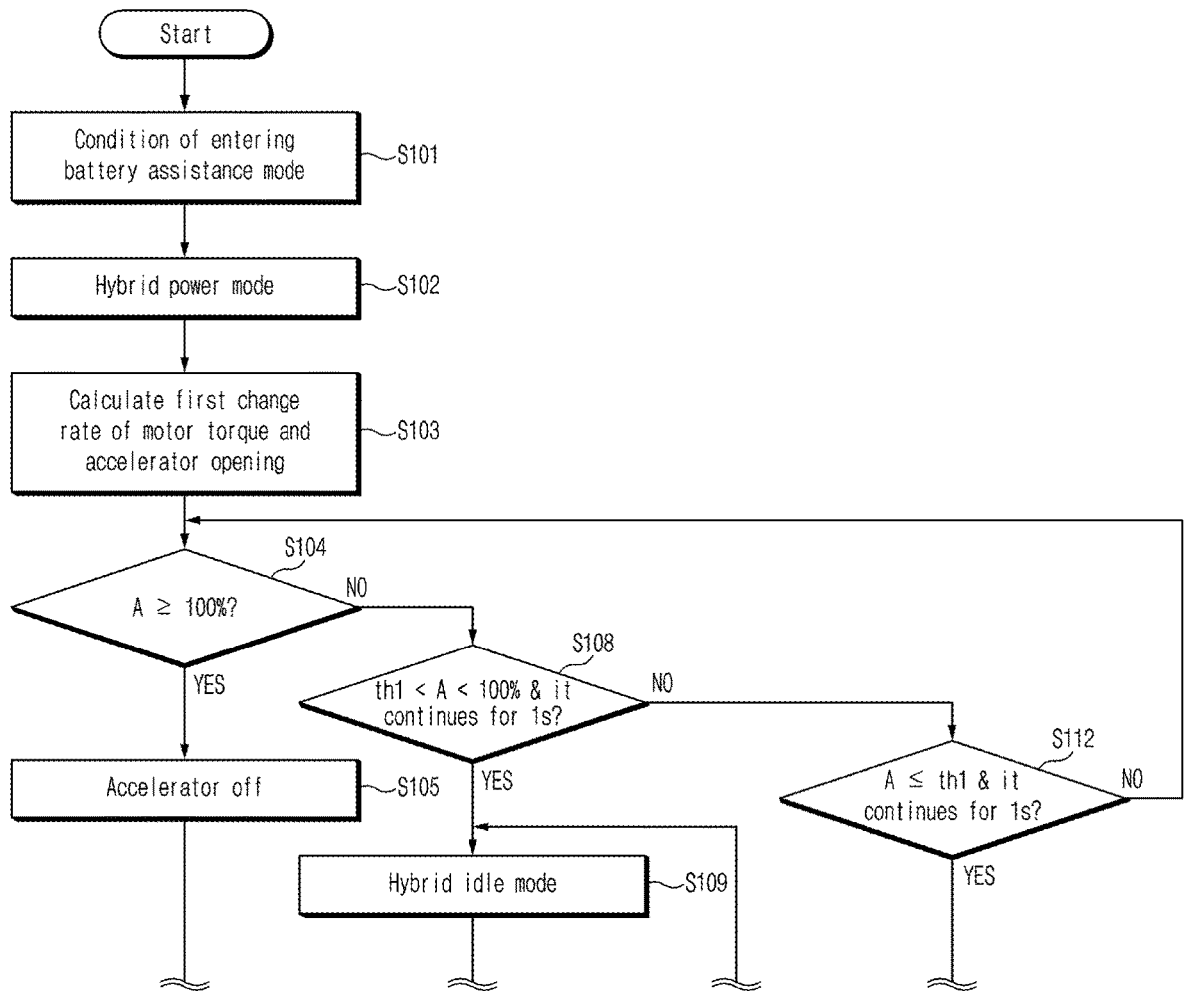
FIGS. 7A and 7B illustrate a flowchart showing a battery assisting method for a fuel cell vehicle according to an exemplary embodiment of the present disclosure.
Figure 7B:
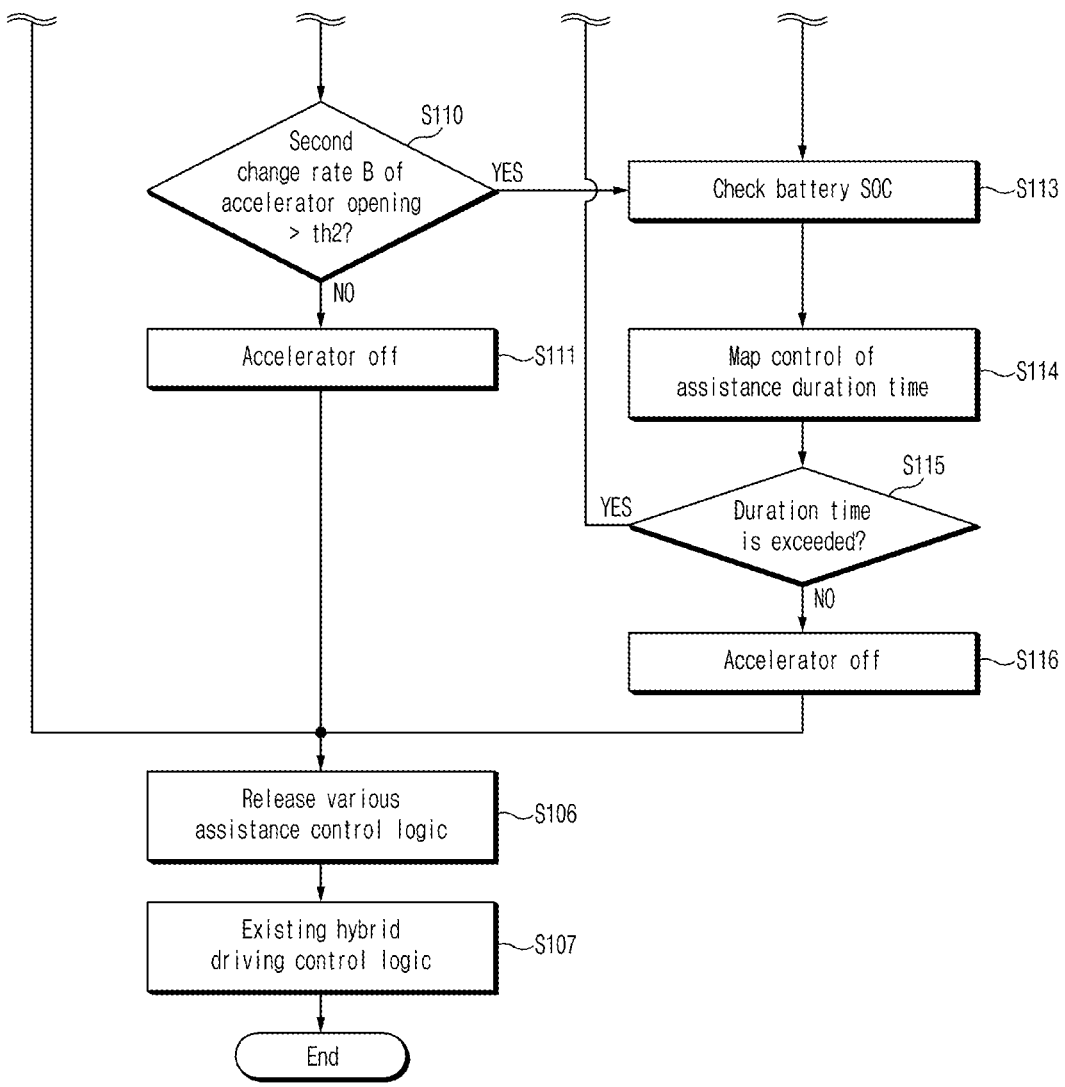

Hereinafter, a battery assisting method for a fuel cell vehicle according to an exemplary embodiment of the present disclosure will be described in detail with reference to FIGS. 7A and 7B. FIGS. 7A and 7B illustrate a flowchart showing a battery assisting method for a fuel cell vehicle according to an exemplary embodiment of the present disclosure.

Hereinafter, it is assumed that the battery assisting apparatus 100 of FIG. 2 performs a process of FIGS. 7A and 7B. In addition, in the description of FIGS. 7A and 7B, operations described as being performed by a device may be understood as being controlled by the controller 130 of the battery assisting apparatus 100 for a fuel cell vehicle.

Referring to FIGS. 7A and 7B, the battery assisting apparatus 100 may determine whether a current vehicle state satisfies a battery assistance entry condition (S101). In this case, the battery assisting apparatus 100 may enter a battery assistance mode when an accelerator is currently pressed and a driver has determination to accelerate and a battery SOC is equal to or greater than the reference value. In the meantime, a battery assistance entry release condition is an accelerator off state.

When the battery assistance entry condition is satisfied, the battery assisting apparatus 100 may enter a hybrid power mode (S102). In this case, the hybrid power mode is a mode in which both a stack battery and a battery output are used.

The battery assisting apparatus 100 may calculate a first change rate based on a change rate of motor torque and a change rate of accelerator opening (S103). In this case, the first change rate A may be calculated by considering peak values of motor torque and accelerator opening as maximum values when assistance entering is performed.

The battery assisting apparatus 100 may determine whether the first change rate A is 100% or more (S104), and when the first change rate A is 100% or more, determines that the accelerator is off (S105), and releases variable assistance control logic (S106). Next, a conventional hybrid driving control logic is performed (S107). In this case, a point that the first change rate A is 100% or more may include a case in which a driver turns off the accelerator. That is, when the first change rate A is 100% or more, the driver presses on the accelerator and then fully releases the accelerator, for example, when the accelerator opens at a time of start-up, it decreases to 0% after reaching 100%.

In the meantime, when the first change rate A is not 100% or more, Variable control logic 1 and Variable control logic 2 are performed. Steps S108 to S111 correspond to Variable control logic 1, and steps S112 to S116 correspond to Variable control logic 2.

First, the battery assisting apparatus 100 determines whether the first change rate A is less than 100% or greater than the threshold th1 and continues for more than t seconds (S108), and when a state that the first change rate A is less than 100% or greater than the threshold th1 continues for more than t seconds, enters the hybrid idle mode (S109). The threshold th1 may be set in advance by an experimental value as a reference value for determining the first change rate for determining whether to maintain or release the battery assistance. For example, this is a case in which the accelerator opening when starting is reduced to 40% after 100%, which is a case in which the driver's determination to accelerate is greatly reduced.

In this case, the hybrid idle mode is a mode using only a stack battery output. In addition, a case where the first change rate A is less than 100% or greater than the threshold value th1 indicates a state that the determination to accelerate is reduced, but the accelerator is not off as a state that the driver presses and releases the accelerator, but does not release a foot thereof, and is lightly pressing an accelerator pedal. Conventionally, in this case, since the accelerator is continuously pressed, the battery assistance mode continues even when the driver's determination to accelerate is reduced, which may unnecessarily consume the battery SOC. In the present disclosure, in this case, it may be determined that the determination to accelerate is reduced, it may be determined whether to continue or cancel the assistance mode in consideration of the change rate of accelerator opening, and the assistance duration time may also be adjusted depending on the battery SOC. Hereinafter, this process will be described in detail.

Thereafter, the battery assisting apparatus 100 may calculate a second change rate B, which is the change rate of accelerator opening to determines whether the second change rate B is greater than a threshold value th2 (5110). The second change rate B may be calculated by considering the current value of the accelerator opening value as a minimum value when the hybrid idle mode is switched.

Accordingly, when the second change rate B is less than or equal to the threshold value th2 and the accelerator is off (S111), variable assistance control logic is released (S106), and existing hybrid driving control logic is performed (S107).

When the second change rate B is greater than the threshold th2, the battery assisting apparatus 100 checks the battery SOC (S113) and performs map control of an assistance duration time (S114).

Thereafter, the battery assisting apparatus 100 determines whether an assistance duration time is exceeded (S115), and when the accelerator is off before the assistance duration time is exceeded (S116), variable assistance control logic is released (S107). On the other hand, when the assistance duration time is exceeded, it returns to the hybrid idle mode (S109).

As such, when a state that the first change rate is less than 100% or greater than the threshold value th1 continues for more than t seconds, the battery assisting apparatus 100 may enter the hybrid idle mode by determining that an amount of output required by the driver has decreased, and may release the variable assistance control logic or adjust the assistance duration time depending on the second change rate.

On the other hand, in the case of an NO condition in step S108, the battery assisting apparatus 100 may determine whether a state in which the first change rate A is equal to or less than the threshold value th1 continues for more than t seconds (S112), and checks the battery SOC when the first change rate A is less than the threshold value th2 and continues for more than t seconds (S113). That is, the case where the first change rate A is less than the threshold value th2 and continues for more than t seconds includes a case where a driver presses on an accelerator and then slightly releases the accelerator, e.g., a case where accelerator opening is reduced to 80% after 100% at a time of start-up, indicating that driver's determination to accelerate is still large.

As such, when the first change rate A is less than the threshold value th2 and continues for more than t seconds, the battery assisting apparatus 100 may determine that the driver has the determination to accelerate and determines a battery assistance possible section. Then, the battery assisting apparatus 100 may check the battery SOC (S113), and may vary a battery assist duration time for maintaining the target SOC (S114). Then, the battery assisting apparatus 100 may check whether a battery assistance duration time has elapsed (S115), and if not, when the accelerator is off (S116), may release the variable assistance control logic (S106) and perform the existing hybrid driving control logic (S107).

In addition, the threshold value th2 may be set in advance by an experimental value as a reference value for determining the second change rate based on the change rate of accelerator opening for determining the determination to re-accelerate and the battery assistance entrance.

The t second may be set in advance by an experimental value as a reference value for determining a maintaining time of the first change rate for determining whether to maintain or release the battery assistance.

Thereafter, the battery assisting apparatus 100 may sequentially perform the above-described steps S111. S116, S106, and S107.

As such, according to the present disclosure, it may determine whether to continue or release the battery assistance mode depending on the first change rate A in consideration of both the change rate of motor torque and the change rate of accelerator opening.

In this case, instead of simply determining that the accelerator is off and releasing the battery assistance mode, even when the accelerator is not turned off, the driver's determination to accelerate may be determined depending on the change rate of motor torque and the change rate of accelerator opening, and when the determination to accelerate is decreased, the use of the battery SCO may be reduced by releasing the battery assistance mode.

Figure 8:
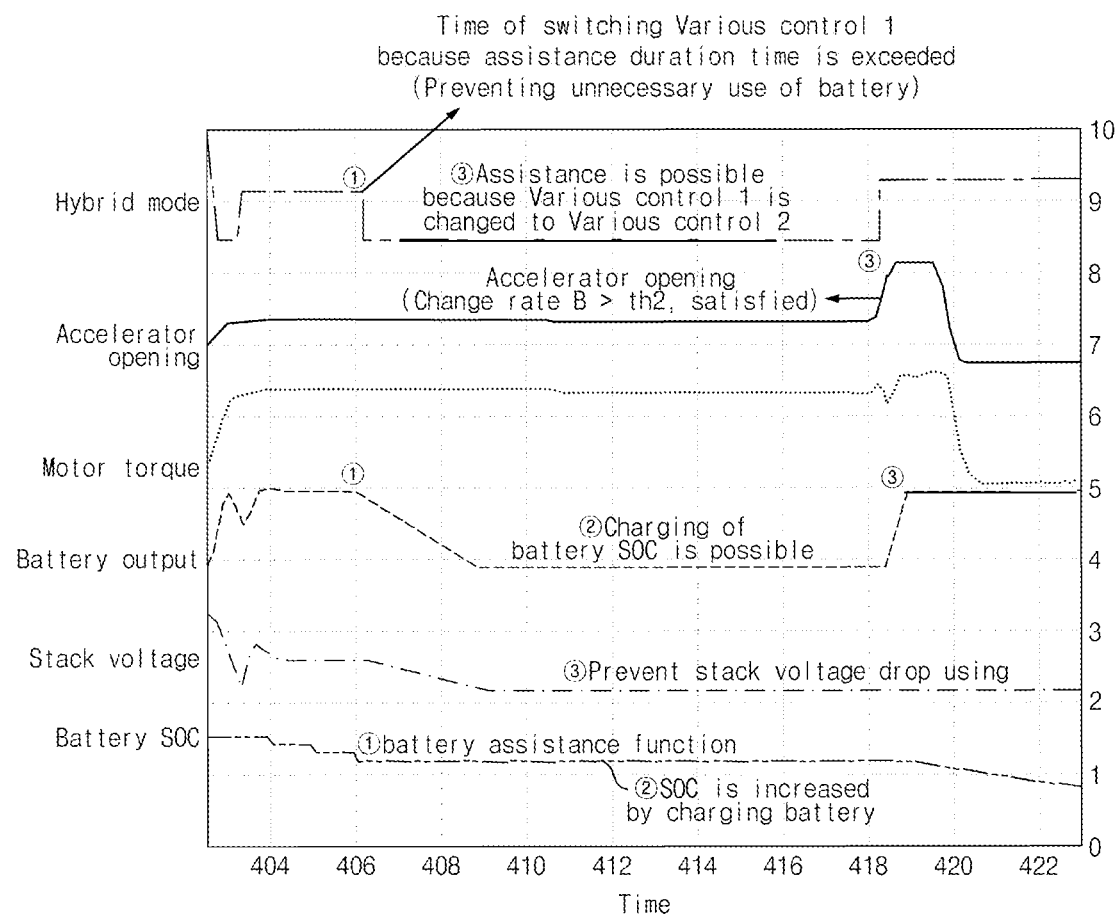
FIG. 8 illustrates a view for describing a battery assistance effect of a fuel cell vehicle according to an exemplary embodiment of the present disclosure.

FIG. 8 illustrates a view for describing a battery assistance effect of a fuel cell vehicle according to an exemplary embodiment of the present disclosure.

Comparing FIG. 8 with FIG. 1, it can be seen that it is possible to prevent the reduction of SOC through the use of unnecessary battery output by applying a battery assistance duration time map depending on the battery SOC.

In the situation of ①, it is changed to Variable control logic 1 by the assistance duration time map, and the reduction of SOC is prevented by reducing the battery output.

In the situation of ②, the battery SOC may be charged, and a SOC synergistic effect can be obtained by the stack output.

In the situation of ③, at a time of driver re-acceleration (rapid acceleration), Variable control logic 1 may be changed to Variable control logic 2, and the battery assistance is enabled.

In this case, it is possible to reduce a stack output burden and prevent a voltage drop by enabling the battery assistance.

Figure 9:
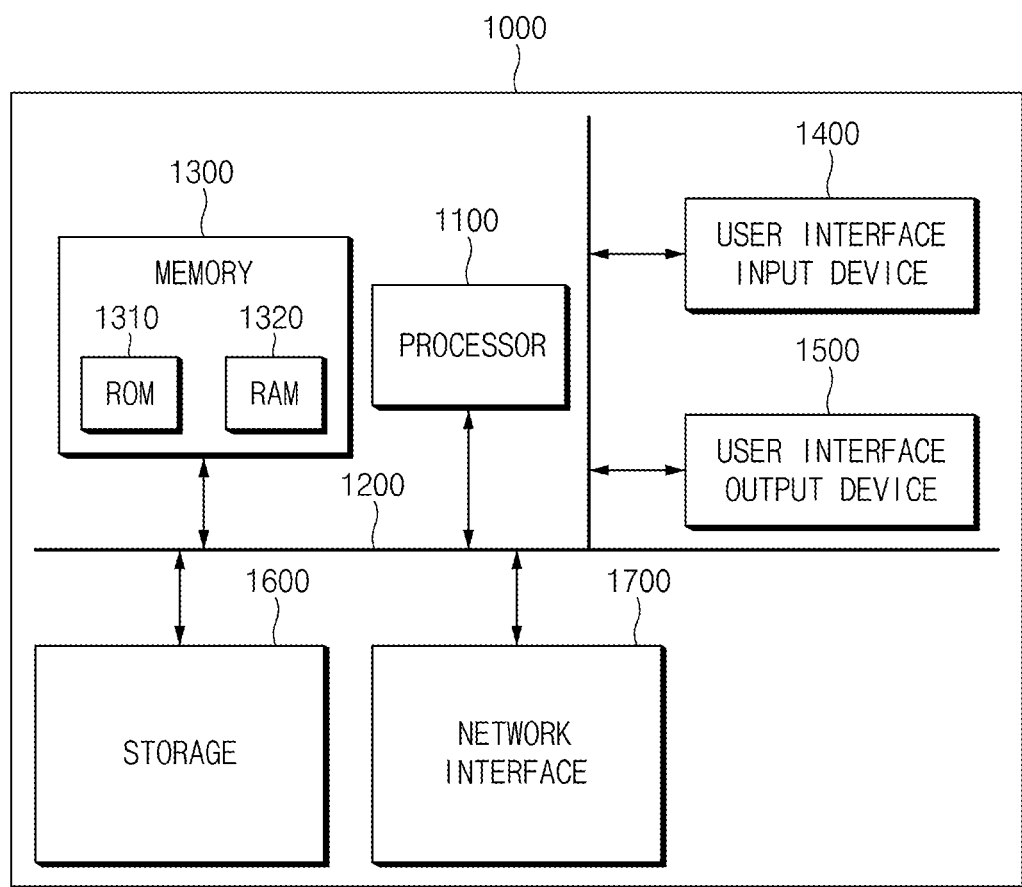
FIG. 9 illustrates a computing system according to an exemplary embodiment of the present disclosure.

FIG. 9 illustrates a computing system according to an exemplary embodiment of the present disclosure.

Referring to FIG. 9, the computing system 1000 may include at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A battery assisting apparatus for a fuel cell apparatus, comprising: a controller configured to: enter a battery assistance mode that supplies power to a vehicle using a battery; determine an increase or decrease of an amount of acceleration, based on a change rate of motor torque and a change rate of accelerator opening, when the battery assistance mode is entered, release the battery assistance mode when the amount of acceleration is decreased, in a section where the accelerator is changing before the accelerator is turned off; and maintain a State Of Charge (SOC) of the battery at a predetermined level to prevent consumption of the battery SOC through control of the battery assistance mode; and a storage configured to store data and algorithms driven by the controller; wherein the controller is further configured to: enter a hybrid power mode when the battery assistance mode is entered, calculate the change rate of motor torque from a maximum value 0% by using a peak value of motor torque at a time of entering the hybrid power mode as the maximum value, calculate the change rate of accelerator opening by using a peak value of accelerator opening at the time entering the hybrid power mode as a maximum value, calculate a first changing rate using the change rate of motor torque and the change rate of accelerator opening, determine that the accelerator is off and release the battery assistance mode when the first change rate is 100% or more, switch from the hybrid power mode to a hybrid idle mode when a state that the first change rate is less than 100% and is greater than a first predetermined threshold value is maintained for a predetermined time, and calculate the change rate of accelerator opening from a minimum value to 100% as a second change rate by setting an accelerator opening value at a time of switching to the hybrid idle mode to the minimum value.

2. The battery assisting apparatus of claim 1, wherein the controller releases the battery assistance mode even when an accelerator is not off, in the case where the amount of acceleration is decreased.

3. The battery assisting apparatus of claim 1, wherein the controller
releases the battery assistance mode when the accelerator is off, in the case where the second change rate is less than or equal to a second predetermined threshold value.

4. The battery assisting apparatus of claim 1, wherein the controller checks a battery state of charge (SOC) when the second change rate is greater than a second predetermined threshold value.

5. The battery assisting apparatus of claim 4, wherein the controller
varies a battery assistance duration time by using the battery SOC and a target SOC.

6. The battery assisting apparatus of claim 5, wherein the controller
varies the battery assistance duration time such that the battery SOC maintains the target SOC.

7. The battery assisting apparatus of claim 6, wherein the controller
determines whether the varied battery assistance duration time is exceeded, and
determines again whether the second change rate exceeds a second threshold value when the varied battery assist duration time is exceeded.

8. The battery assisting apparatus of claim 6, wherein the controller
continues to perform the battery assistance mode when the varied battery assistance duration time is not exceeded, and releases the battery assistance mode when the accelerator is off.

9. The battery assisting apparatus of claim 1, wherein the controller
checks a battery SOC, to vary an assistance duration time by using the battery SOC when a state in which the first change rate is equal to or smaller than a first predetermined threshold value is maintained for a predetermined time.

10. The battery assisting apparatus of claim 1, wherein the controller
enters the battery assistance mode when the amount of acceleration occurs,
releases the battery assistance mode when the accelerator is off, and
determines whether to release the battery assistance mode depending on a decrease rate of the amount of acceleration when the accelerator is not off and the amount of acceleration is decreased.

11. The battery assisting apparatus of claim 10, wherein the controller is further configured to:
enter a hybrid idle mode when the decrease rate of the amount of acceleration is greater than a first predetermined reference value,
set the accelerator opening value at a time of switching the hybrid idle mode to a minimum value, and
determine whether to release the battery assistance mode by using the change rate of accelerator opening from the minimum value to 100%.

12. A battery assisting method for a fuel cell battery, comprising: entering a battery assistance mode that supplies power to a vehicle using a battery; calculating a change rate of motor torque and a change rate of accelerator opening; determining an increase or decrease of an amount of acceleration based on the change rate of motor torque and the change rate of accelerator opening; releasing the battery assistance mode when the amount of acceleration is decreased in a section where the accelerator is changing before the accelerator is turned off; and maintain a State Of Charge (SOC) of the battery at a predetermined level to prevent consumption of the SOC through control of the battery assistance mode; wherein the calculating of the change rate of motor torque and the change rate of accelerator opening comprises:

entering a hybrid power mode when the battery assistance mode is entered, calculating the change rate of motor torque from a maximum value 0% by using a peak value of motor torque at a time of entering the hybrid power mode as the maximum value, calculating the change rate of accelerator opening by using a peak value of accelerator opening at the time entering the hybrid power mode as a maximum value, calculating a first changing rate using the change rate of motor torque and the change rate of accelerator opening, wherein releasing the battery assistance mode comprises:

determining that the accelerator is off and releasing the battery assistance mode when the first change rate is 100% or more, switching from the hybrid power mode to a hybrid idle mode when a state that the first change rate is less than 100% and is greater than a first predetermined threshold value is maintained for a predetermined time, and calculating the change rate of accelerator opening from a minimum value to 100% as a second change rate by setting an accelerator opening value at a time of switching to the hybrid idle mode to the minimum value.

13. The battery assisting method of claim 12, wherein the releasing of the battery assistance mode further comprises:
    releasing the battery assistance mode when the accelerator is off, in the case where the second change rate is less than or equal to a second predetermined threshold value.

14. The battery assisting method of claim 13, wherein the releasing of the battery assistance mode further comprises:
    checking a battery state of charge (SOC) when the second change rate is greater than a second threshold value;
    varying a battery assistance duration time by using the battery SOC and a target SOC;
    determining whether the varied battery assistance duration time is exceeded; and
    determining again whether the second change rate exceeds the second threshold value when the varied battery assist duration time is exceeded.

\* \* \* \* \*